US012395743B2

(12) United States Patent
Kobayashi

(10) Patent No.: US 12,395,743 B2
(45) Date of Patent: Aug. 19, 2025

(54) CONTROL APPARATUS AND CONTROL METHOD THEREOF

(71) Applicant: CANON KABUSHIKI KAISHA, Tokyo (JP)

(72) Inventor: Kyoko Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 339 days.

(21) Appl. No.: 18/302,251

(22) Filed: Apr. 18, 2023

(65) Prior Publication Data

US 2023/0345129 A1 Oct. 26, 2023

(30) Foreign Application Priority Data

Apr. 26, 2022 (JP) ................................ 2022-072672

(51) Int. Cl.
*H04N 23/69* (2023.01)
*G06T 7/20* (2017.01)
*G06T 7/62* (2017.01)
*G06T 7/70* (2017.01)
*H04N 23/695* (2023.01)

(52) U.S. Cl.
CPC ............ *H04N 23/695* (2023.01); *G06T 7/20* (2013.01); *G06T 7/62* (2017.01); *G06T 7/70* (2017.01); *H04N 23/69* (2023.01)

(58) Field of Classification Search
CPC .... H04N 23/695; H04N 23/69; H04N 23/611; G06T 7/20; G06T 7/62; G06T 7/70
USPC ........................................................ 382/103
See application file for complete search history.

(56) References Cited

U.S. PATENT DOCUMENTS

2014/0267772 A1\* 9/2014 Morin .................. G05D 1/0094
348/169

FOREIGN PATENT DOCUMENTS

JP 2020-005122 A 1/2020

\* cited by examiner

*Primary Examiner* — Stephen P Coleman
(74) *Attorney, Agent, or Firm* — Cowan, Liebowitz & Latman, P.C.

(57) ABSTRACT

A control apparatus controls tracking shooting performed by an image capturing apparatus. The control apparatus detects a subject in an image obtained by the image capturing apparatus; tracks the subject by controlling a capturing direction of the image capturing apparatus based on the detected position of the subject; and performs predetermined processing when a lost state in which a subject is unable to be detected during tracking of the subject occurs. If it is possible to derive the direction of movement of a subject immediately before occurrence of the lost state, with the predetermined degree of reliability or higher, the control apparatus performs processing for determining the capturing direction of the image capturing apparatus after occurrence of the lost state based on the direction of movement.

13 Claims, 11 Drawing Sheets

FIG. 5
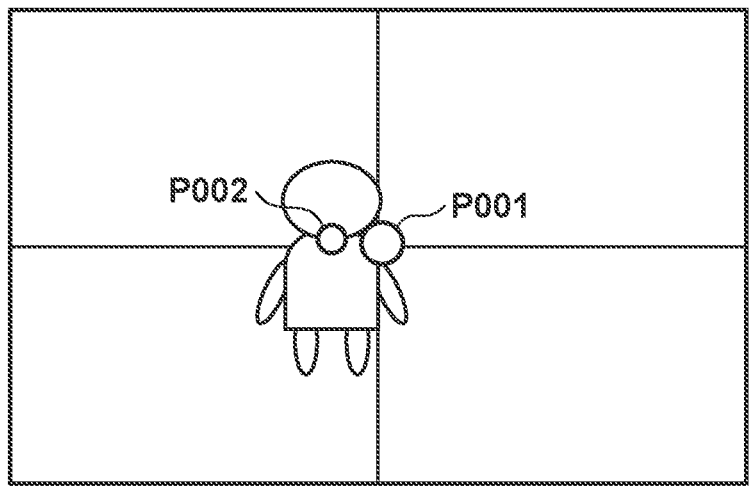
FIELD OF VIEW OF y-th FRAME BEFORE LOSS
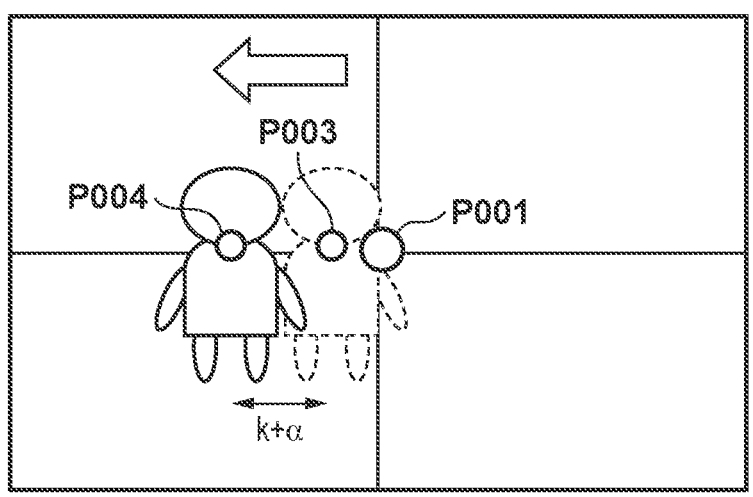
FIELD OF VIEW IMMEDIATELY BEFORE LOSS

FIG. 9
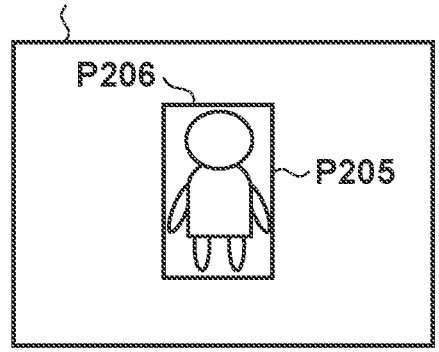
FIELD OF VIEW OF y-th FRAME BEFORE LOSS
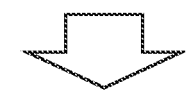
ZOOM-IN (TARGET FIELD OF VIEW)
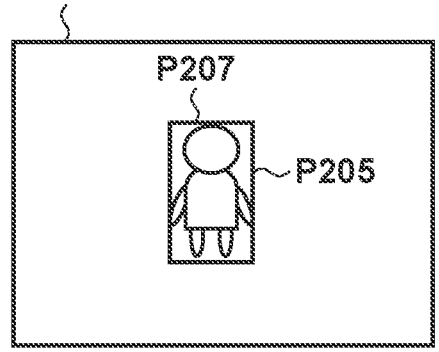
FIELD OF VIEW IMMEDIATELY BEFORE LOSS
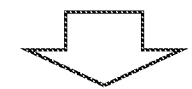
ZOOM-IN (TARGET FIELD OF VIEW)
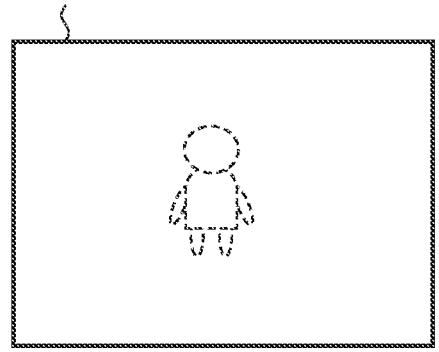
LOSS OCCURRED

FIG. 10
TARGET FIELD OF VIEW
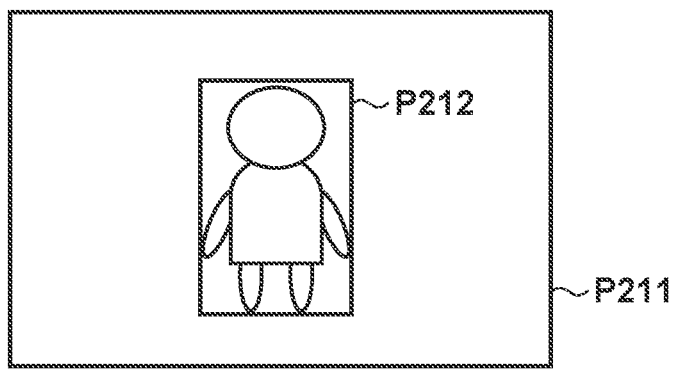
MAXIMUM DETECTION SIZE
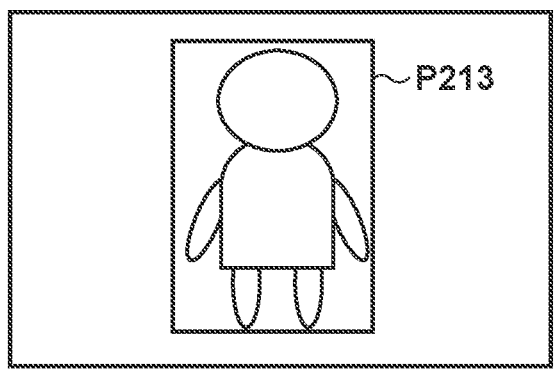
MINIMUM DETECTION SIZE
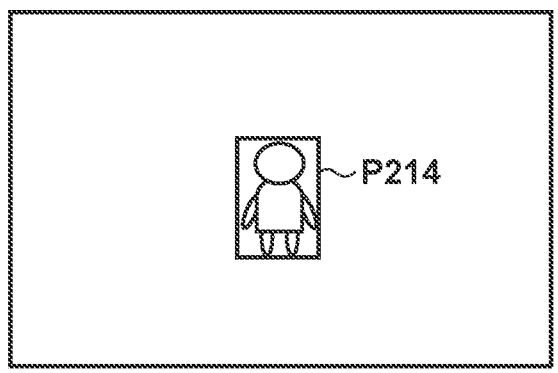

CONTROL APPARATUS AND CONTROL METHOD THEREOF

BACKGROUND OF THE INVENTION

Field of the Invention

The present invention relates to control that is performed on tracking of a subject performed by an image capturing apparatus.

Description of the Related Art

In lectures, sports, and the like, image delivery and recording have been performed in many cases. In addition, automated tracking shooting intended to reduce the cost of labor and the like has come into practical use. In automated tracking shooting, there are cases of losing sight of a subject in a process of controlling an image capturing area of an image capturing apparatus while following movement of the subject (hereinafter, such a case will be referred to as "loss of tracking").

When loss of tracking occurred during tracking shooting, control is performed such as returning to the position/orientation of the home position or holding the field of view at the time of the occurrence of loss of tracking. In addition, Japanese Patent Laid-Open No. 2020-5122 proposes a configuration in which an image capturing area is increased centered on a position where a subject disappeared and tracking shooting is continued, and a configuration in which, if a position where a subject disappeared is a screen edge, an image capturing area is directed to a home position.

However, if it is envisioned that a subject is redetected after occurrence of loss of tracking and tracking is resumed, there are cases where performing the above conventional operation that is performed when loss of tracking occurs makes it difficult to redetect the subject. When, for example, loss of tracking occurs in a state where the size of the subject in a captured image is small, and an image capturing area is increased, the size of the subject in the captured image decreases further, making redetection difficult. In addition, when control of returning to the home position is performed when loss of tracking occurs, additional position/orientation control is required for redetecting the subject.

SUMMARY OF THE INVENTION

According to one aspect of the present invention, a control apparatus that controls tracking shooting performed by an image capturing apparatus, the control apparatus comprises: a detection unit configured to detect a subject in an image obtained by the image capturing apparatus; a tracking unit configured to track the subject by controlling a capturing direction of the image capturing apparatus based on a position of the subject detected by the detection unit; and a processing unit configured to perform predetermined processing when a lost state where the detection unit is unable to detect a subject occurs while the tracking unit is tracking the subject, the processing unit includes: a decision unit configured to decide whether or not it is possible to derive, with a first degree of reliability or higher, a direction of movement of a subject immediately before occurrence of the lost state, and a determination unit configured to, if the decision unit decides that it is possible to derive the direction of movement with the first degree of reliability or higher, perform processing for determining the capturing direction of the image capturing apparatus after occurrence of the lost state based on the direction of movement, as the predetermined processing.

According to another aspect of the present invention, a control apparatus that controls tracking shooting performed by an image capturing apparatus, the control apparatus comprises: a detection unit configured to detect a subject in an image obtained by the image capturing apparatus; a tracking unit configured to track the subject by controlling a shooting field of view of the image capturing apparatus based on a size of the subject detected by the detection unit; a processing unit configured to perform predetermined processing when a lost state where the detection unit is unable to detect a subject occurs while the tracking unit is tracking the subject, the processing unit includes: a decision unit configured to decide whether or not it is possible to derive, with a predetermined degree of reliability or higher, a direction of movement of the subject in the depth direction of the image immediately before occurrence of the lost state, and a determination unit configured to, if the decision unit decides that it is possible to derive the direction of movement with the predetermined degree of reliability or higher, perform processing for determining a shooting field of view that is a shooting field of view after occurrence of the lost state of the image capturing apparatus based on the direction of movement, as the predetermined processing.

The present invention enables advanced tracking control of a subject.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram describing a method for determining a lost direction.

FIG. 9 is a diagram describing a method for determining a lost direction.

FIG. 10 is a diagram describing a detected size at a target field of view.

DESCRIPTION OF THE EMBODIMENTS

Figure 1:
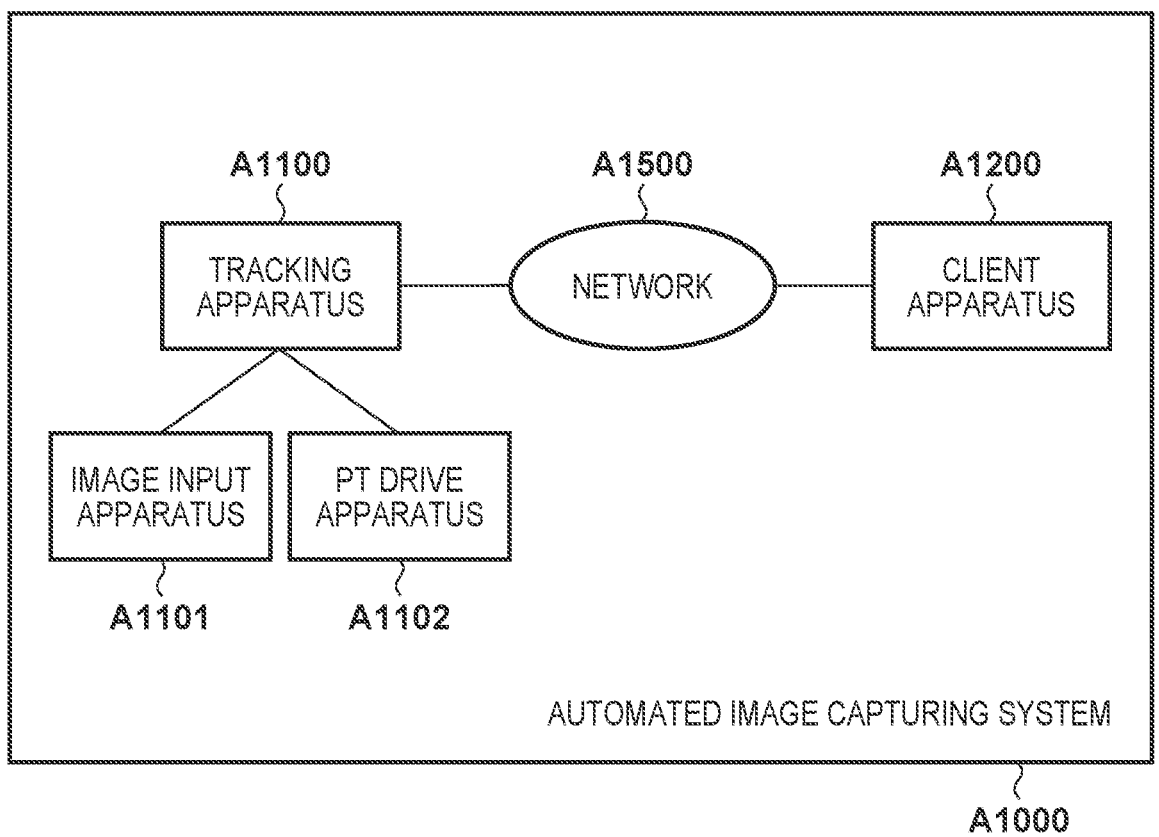
FIG. 1 is a diagram showing an overall configuration of an automated image capturing system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As a first embodiment of a tracking apparatus according to the present invention, a tracking apparatus in an automated image capturing system will be described below as an example. Particularly, pan-tilt (PT) control of a shooting area when a subject went out of view (is lost) will be described.

System Configuration and Apparatus Configuration

FIG. 1 is a diagram showing an overall configuration of an automated image capturing system A1000 that includes a tracking apparatus A1100 according to the first embodiment. The tracking apparatus A1100 controls a shooting area of an image input apparatus A1101, which is a shooting apparatus, by controlling a PT drive apparatus A1102 that drives the image input apparatus A1101 in a PT direction, based on an image input from the image input apparatus A1101. In addition, the automated image capturing system A1000 includes a client apparatus A1200 that is a user terminal for remotely controlling the tracking apparatus A1100. The tracking apparatus A1100 and the client apparatus A1200 are connected to each other via a network A1500, for example.

The tracking apparatus A1100 controls the image input apparatus A1101 and the PT drive apparatus A1102 based on setting information input from the client apparatus A1200, performs shooting, and outputs a captured image to the client apparatus A1200. The client apparatus A1200 provides an image input via a network, to the user via an image display device such as a monitor. The client apparatus A1200 also accepts setting information from the user via input devices such as a keyboard and a mouse, and outputs the accepted setting information to the tracking apparatus A1100 via the network A1500.

Figure 2:
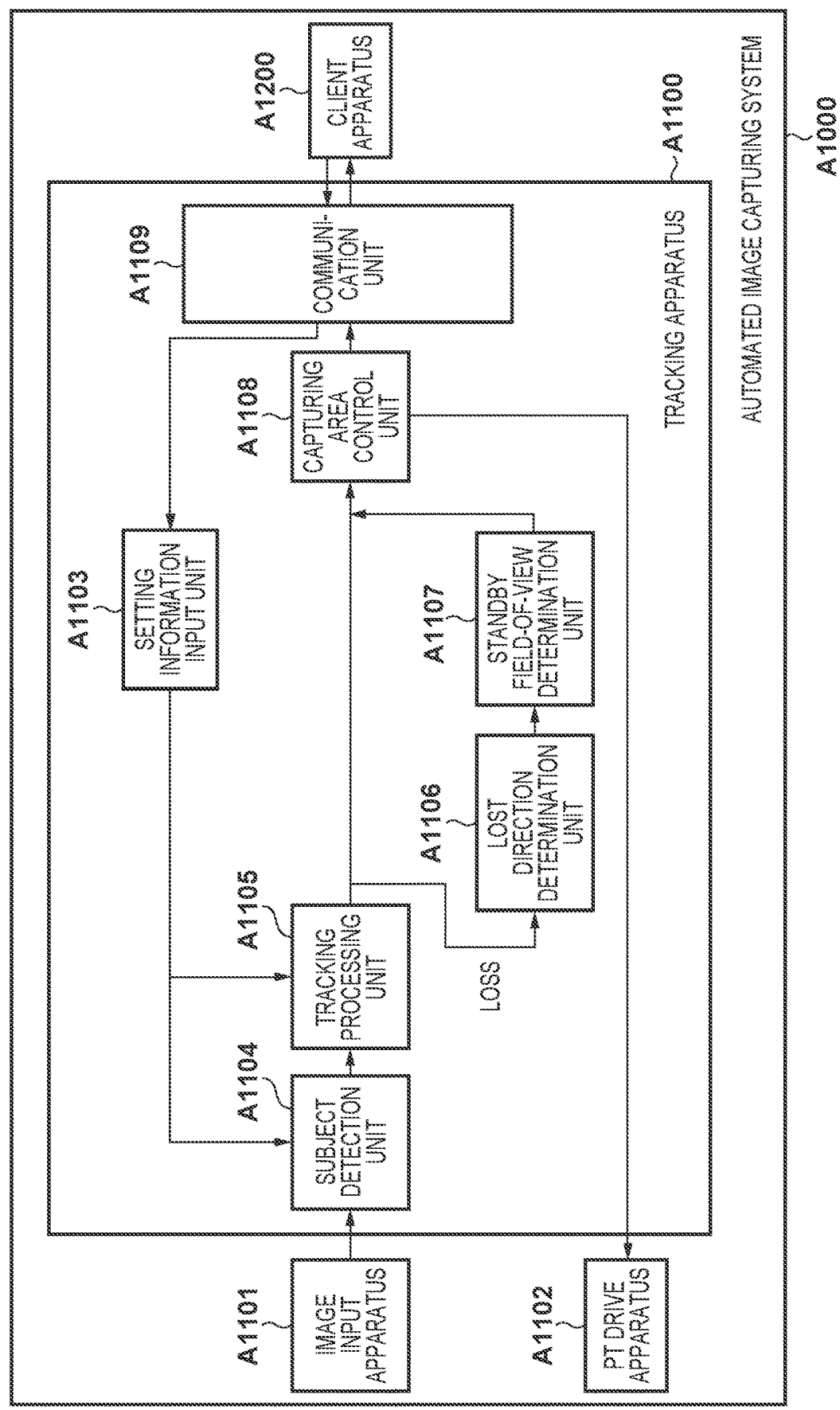
FIG. 2 is a block diagram showing a functional configuration of a tracking apparatus according to the first embodiment.

FIG. 2 is a block diagram showing a functional configuration of the tracking apparatus A1100 according to the first embodiment. The tracking apparatus A1100 controls an image capturing area based on an image obtained from the image input apparatus A1101 and setting information obtained from the client apparatus A1200, and accordingly shoots a subject.

The tracking apparatus A1100 includes a setting information input unit A1103, a subject detection unit A1104, a tracking processing unit A1105, a lost direction determination unit A1106, a standby field-of-view determination unit A1107, an image capturing area control unit A1108, and a communication unit A1109.

The setting information input unit A1103 outputs setting information received from the communication unit A1109, to the subject detection unit A1104 and the tracking processing unit A1105. Here, the setting information include information regarding a target position and a target size. The target position is expressed by positional coordinates in a frame image, and the tracking apparatus performs PT control such that a subject is positioned at the target position (which will be described later with reference to FIG. 5). Note that the setting information may include other information such as a criterion for determination on loss of tracking of a subject.

The subject detection unit A1104 analyzes an image (frame image) input from the image input apparatus A1101, based on the input setting information. The subject detection unit A1104 then detects a subject in the frame image, and outputs detection information to the tracking processing unit A1105. Here, it is envisioned that a subject position (the positional coordinates of the subject in the frame image) is output as the detection information, but other positional information such as space coordinates may also be used as long as the information indicates the position of the subject. In addition, additional information such as a detected size and the detection accuracy may be included as a detection result.

The tracking processing unit A1105 performs processing for tracking the subject based on the input detection information and the target position input from the setting information input unit A1103. Specifically, as tracking processing, the position of the subject in the frame image is held as a tracking history. In addition, a determination is performed as to whether or not the subject has been lost, based on the tracking history. Here, when detection of the subject fails consecutively in x frames of the input image, it is determined that loss of tracking has occurred. Hereinafter, for ease of description, x=1.

Then, if it is determined that loss of tracking has not occurred, the tracking processing unit A1105 outputs the subject position and the target position to the image capturing area control unit A1108. On the other hand, if it is determined that loss of tracking has occurred, the tracking processing unit A1105 outputs the tracking history to the lost direction determination unit A1106.

The lost direction determination unit A1106 derives a lost direction of the subject based on the input tracking history. The lost direction is the direction of movement (the direction of the vector) of the subject immediately before loss of tracking occurred. In addition, in the first embodiment, determination is also performed as to whether or not the lost direction is precise (=derived with a predetermined degree of reliability or higher). Specifically, if the subject position is separated from the target position consecutively in y or more frames in the same direction immediately before loss of tracking occurred, and the positional difference therebetween is larger than or equal to a threshold value, it is determined that the lost direction is precise. If it is determined that the derived lost direction is precise, the lost direction determination unit A1106 outputs the lost direction as a determination result, and if it is determined that the derived lost direction is not precise, the lost direction determination unit A1106 outputs information indicating that the derived lost direction is not precise, as a determination result. The lost direction determination unit A1106 outputs the calculated lost direction and a detected position before loss of tracking (subject position immediately before loss of tracking occurred) to the standby field-of-view determination unit A1107.

The standby field-of-view determination unit A1107 calculates a standby field of view (standby position/orientation) corresponding to an image capturing area in which the subject is highly likely to be redetectable, based on the input determination on the lost direction and the detected position before loss of tracking. Specifically, when the lost direction is input as a determination result, it is determined that there is a position/orientation at which the subject is highly likely to be present, and a field of view obtained by performing PT control so as to be directed in the lost direction in a range in which the detected position before loss of tracking is fully in view is used as a standby field of view. On the other hand, if information indicating that the lost direction is not precise is input as a determination result, it is determined that there is no field of view at which the subject is highly likely to be present, and the current field of view is used as a standby field of view. The standby field-of-view determination unit A1107 outputs the standby field of view to the image capturing area control unit A1108.

When loss of tracking has not occurred, the image capturing area control unit A1108 continues tracking control based on the subject position and the target position input from the tracking processing unit A1105. That is to say, the image capturing area control unit A1108 performs PT control and controls the image capturing area, such that the subject position and the target position match each other. On the other hand, when loss of tracking has occurred, PT control is performed based on the standby field of view input from the standby field-of-view determination unit A1107, as processing for loss of tracking. Specifically, the image capturing area control unit A1108 outputs a PT control instruction to the PT drive apparatus A1102, and outputs an image to the communication unit A1109.

The PT drive apparatus A1102 performs PT driving based on the input PT control instruction and accordingly moves the image capturing area. The communication unit A1109 outputs the image input from the image capturing area control unit A1108, to the client apparatus A1200. The communication unit A1109 also outputs setting information input from the client apparatus A1200, to the setting information input unit A1103.

Operation of Apparatus

Figure 3:
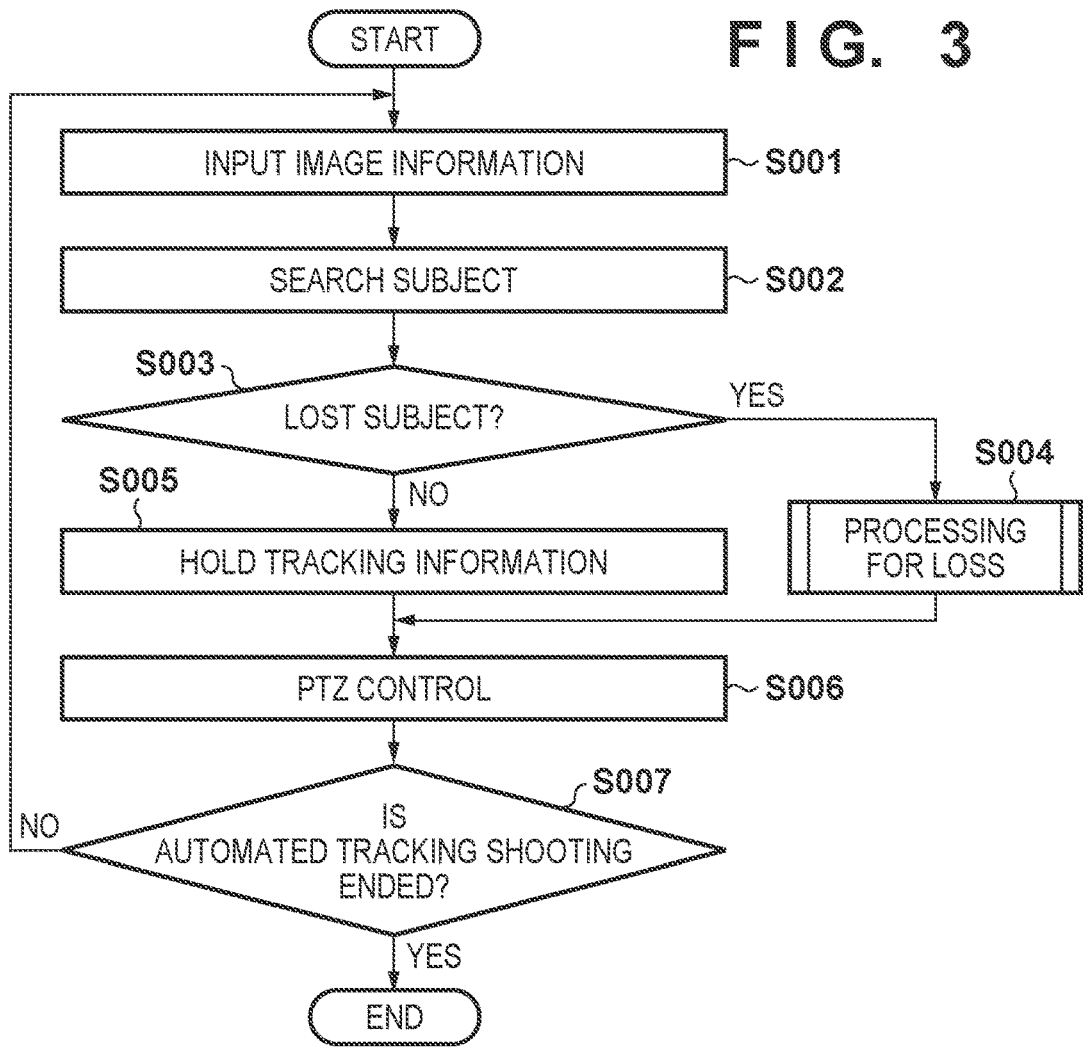
FIG. 3 is a flowchart of tracking processing according to the first embodiment.

FIG. 3 is a flowchart of tracking processing according to the first embodiment. The automated image capturing system A1000 starts tracking shooting and image delivery based on a user operation performed on the client apparatus A1200, for example.

In step S001, the tracking apparatus A1100 starts to receive (input of) an image output by the image input apparatus A1101. In step S002, the subject detection unit A1104 detects a subject in the input image, and outputs a detection result.

In step S003, the tracking processing unit A1105 determines whether or not loss of tracking of the subject has occurred. If loss of tracking has occurred (Yes in step S003), the tracking processing unit A1105 outputs a tracking history, and the procedure advances to step S004. If loss of tracking has not occurred (No in step S003), the tracking processing unit A1105 outputs the subject position, and advances the procedure to step S005.

In step S004, the tracking apparatus A1100 performs processing for loss of tracking based on the tracking history (subject position before loss of tracking). The processing for loss of tracking will be described later in detail with reference to FIG. 4. On the other hand, in step S005, the tracking processing unit A1105 updates the tracking history based on the subject position. In addition, the tracking processing unit A1105 outputs the subject position and the target position.

In step S006, if loss of tracking has not occurred (the procedure has been advanced from step S005), the image capturing area control unit A1108 performs PT control and controls the image capturing area, such that the input subject position and target position match each other. Here, control is performed such that the subject is positioned at a central portion of a frame image. On the other hand, if loss of tracking has occurred (the procedure has been advanced from step S004), the image capturing area control unit A1108 controls the image capturing area in accordance with the input standby field of view. A configuration may be adopted in which, at this time, PT speed control for smoothly changing the field of view to the standby field of view is calculated based on a PT speed and a standby field of view at the time of the loss of tracking or immediately before the loss of tracking, and accordingly control is performed.

In step S007, the tracking apparatus A1100 determines whether or not an operation of stopping tracking shooting has been performed, based on a user operation performed on the client apparatus A1200. If the operation has not been performed (No in step S007), the procedure advances to step S001, and tracking shooting continues. On the other hand, if the operation has been performed (Yes in step S007), tracking shooting ends.

Figure 4:
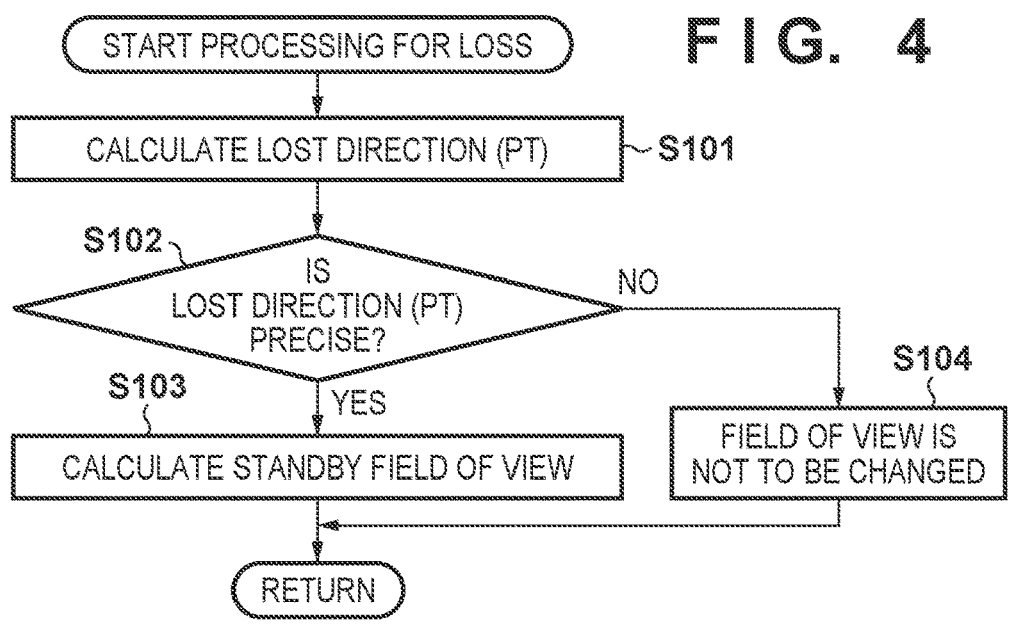
FIG. 4 is a detailed flowchart of processing for loss of tracking according to the first embodiment.

FIG. 4 is a detailed flowchart of processing for loss of tracking (step S004) according to the first embodiment. As described above, the tracking apparatus A1100 performs processing for loss of tracking based on a tracking history.

In step S101, the lost direction determination unit A1106 calculates the lost direction of the subject based on the input tracking history. In the first embodiment, the lost direction corresponds to a direction on the image plane of a captured image (such as upward, downward, left, or right), and is a direction associated with a pan-tilt (PT) coordinate values.

In step S102, the lost direction determination unit A1106 determines whether or not the lost direction calculated in step S101 is precise (=derived with a predetermined degree of reliability or higher). If the lost direction is precise (Yes in step S102), the lost direction determination unit A1106 outputs the calculated lost direction and the detected position before loss of tracking, and advances the procedure to step S103, and if the lost direction is not precise (No in step S102), advances the procedure to step S104.

FIG. 5 is a diagram describing a method for determining a lost direction (steps S101 and S102). In the lower portion in FIG. 5, a frame image immediately before loss of tracking (in other words, a frame in which the subject was lastly detected) is shown. In addition, in the upper portion, the frame image of a yth frame (in the past) before the loss of tracking is shown.

In the frame image of the yth frame before loss of tracking, a point P001 indicates a target position in the frame image (here, the center of the frame image). A point P002 indicates the subject position in the frame image. In the frame image immediately before the loss of tracking, a point P003 indicates the position of the point P002. In addition, a point P004 indicates the subject position detected immediately before loss of tracking occurred.

As described above, in the first embodiment, if the subject position is separated away from the target position consecutively in y or more frames in the same direction immediately before loss of tracking, and the positional difference therebetween is larger than or equal to a threshold value k, it is determined that the lost direction is not precise. Here, y=2. Note that a lost direction may be determined using another method.

In the frame image shown in the lower portion of FIG. 5, the subject position changed in a direction separating away from the target position consecutively in two frames immediately before loss of tracking, and the difference (k+α) is larger than the threshold value k. For this reason, in this example of the frame image, it is determined that the lost direction is precise and the lost direction is "left".

In step S103, the standby field-of-view determination unit A1107 calculates a standby field of view based on the input lost direction and detected position before loss of tracking. Specifically, a field of view at which the subject is highly likely to come into view again is calculated as a standby field of view. As described above, in the first embodiment, a field of view obtained by performing PT control in accordance with the lost direction (here, "left") in a range in which the detected position before loss of tracking is fully in view is used as a standby field of view.

Figure 6:
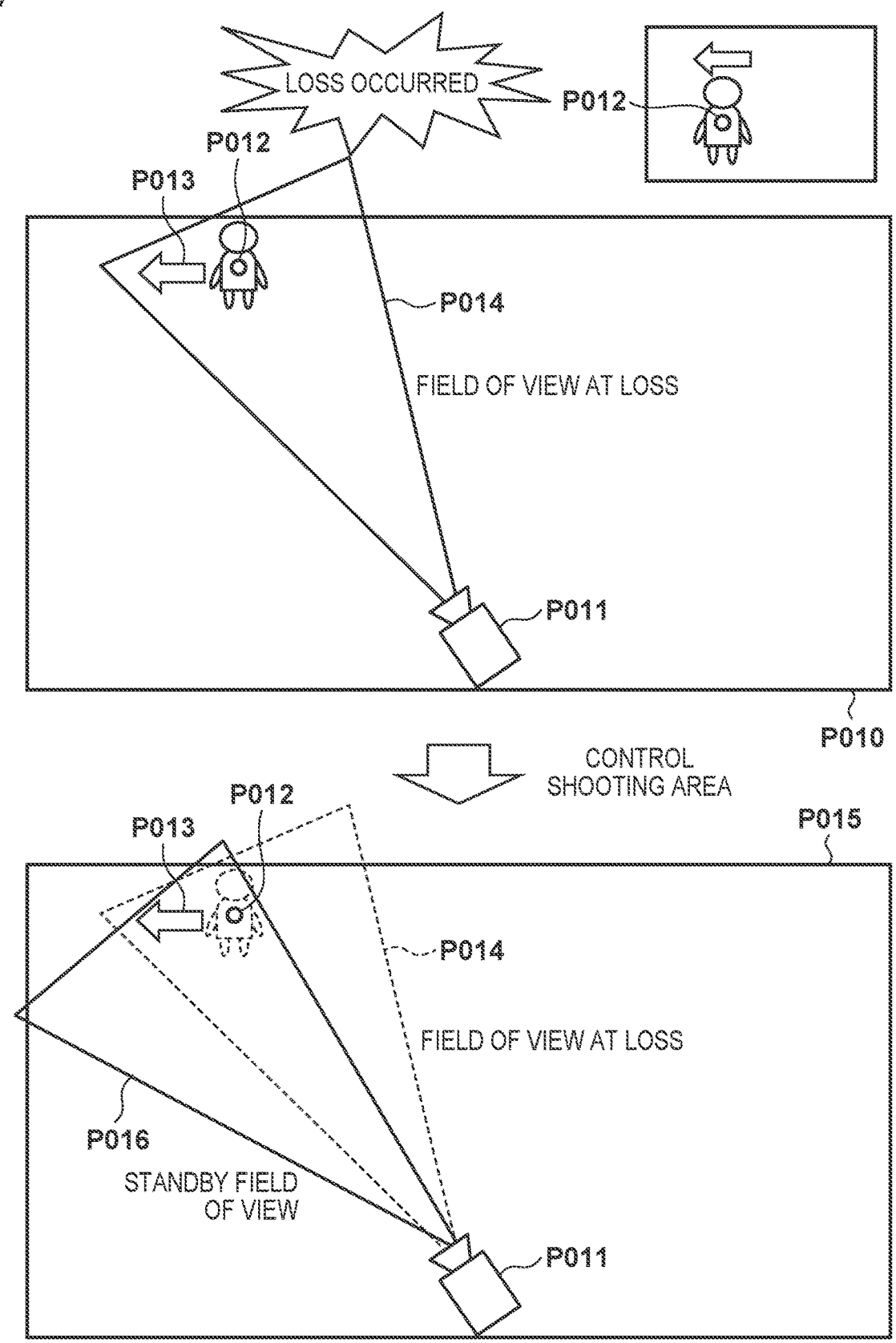
FIG. 6 is a diagram describing a method for deriving a standby field of view.

FIG. 6 is a diagram describing a method for deriving a standby field of view. In the upper portion of FIG. 6, a field of view (shooting area) P014 when detection was lastly performed before determination on loss of tracking is exemplarily shown, and in the lower portion of FIG. 6, a standby field of view P016 that is calculated is exemplarily shown.

A position P011 indicates the geographical position of the image input apparatus A1101 that is a shooting apparatus, a position P012 indicates the geographical position of a subject immediately before loss of tracking, and an arrow P013 indicates a geographical lost direction.

In a situation P010, when loss of tracking occurs immediately after the subject is detected at the position P012, the field of view P016 at which the position P012 is at the edge of the image capturing area that is on the opposite side to the subject lost direction (here, the right edge) is used as a standby field of view. Here, a field of view obtained by performing PT control in accordance with the lost direction in a range in which the position P012 is fully in view is used as a standby field of view, but a field of view at which the position P012 is not fully in view may also be used as a standby field of view.

In addition, immediately after determination on loss of tracking is performed, after an instruction from the user is received, or after a lost state continued for a predetermined time period, a home position that corresponds to a predetermined initial direction (initial position/orientation) may be used as a standby field of view. If the calculated standby field of view is outside a range in which the PT drive apparatus A1102 can perform driving or outside an image capturing region in which tracking can be performed, the home position may be set as a standby field of view.

Furthermore, if the lost direction is the up-down direction (corresponding to the vertical direction) of a frame image, the upper or lower edge of the calculated standby field of view may be corrected in accordance with a position of the subject obtained to this point (or set by the user). Correction may be performed such that the upper or lower edge is not positioned above the position of the head of a person or below the position of the feet, for example.

In step S104, the standby field-of-view determination unit A1107 sets information regarding the current field of view as a standby field of view. That is to say, it is determined that a field of view at which the subject is highly likely to be present cannot be determined, and it is determined that the field of view is not to be changed by performing PT control.

When a standby field of view is determined by the standby field-of-view determination unit A1107 in the above step S103 or S104, the processing for loss of tracking ends and the procedure advances to step S006.

As described above, according to the first embodiment, when loss of tracking of the subject occurs during tracking control, an operation that is performed is changed depending on whether or not the lost direction of the subject is precise. Specifically, if the lost direction is precise, PT control is performed to change the current field of view to a field of view at which the subject is highly likely to be present, based on a tracking history before loss of tracking occurred. Performing such control makes it easier to redetect the subject after loss of tracking occurs, and perform tracking control again.

Second Embodiment

In a second embodiment, control that is performed when a subject moves in the depth direction of a shot image will be described. That is to say, in the first embodiment, PT control of a shooting area that is performed when a subject is lost has been described, but, in the second embodiment, zoom (Z) control of a shooting area when a subject is lost will be described.

System Configuration and Apparatus Configuration

In the system configuration, in FIG. 1, the tracking apparatus A1100 and the PT drive apparatus A1102 are replaced with a tracking apparatus A2100 and a PTZ drive apparatus A2102, respectively. The PTZ drive apparatus A2102 controls a shooting area of the image input apparatus A1101 by performing zoom (Z) control in addition to driving the image input apparatus A1101 in the PT direction, based on control performed by the tracking apparatus A2100. The other apparatuses are similar to those according to the first embodiment (FIG. 1), and thus a detailed description thereof is omitted. Note that, for ease of description, description will be given below assuming that the PTZ drive apparatus A2102 performs only zoom (Z) driving.

Figure 7:
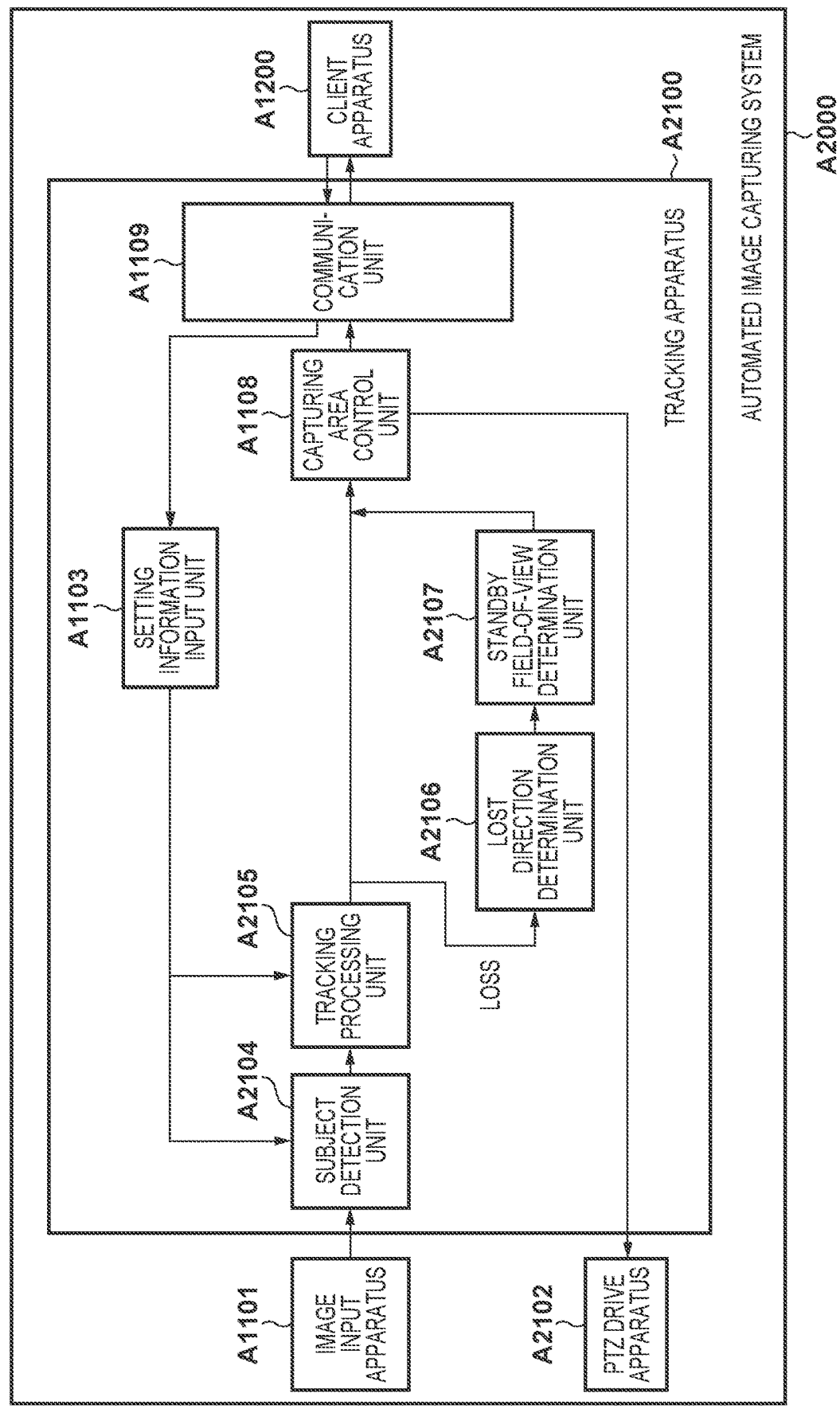
FIG. 7 is a block diagram showing a functional configuration of a tracking apparatus according to a second embodiment.

FIG. 7 is a block diagram showing a functional configuration of the tracking apparatus A2100 according to the second embodiment. Note that function units that are given the same reference signs as those in the first embodiment (FIG. 2) have similar functions, and thus a description thereof is omitted.

The tracking apparatus A2100 includes the setting information input unit A1103, a subject detection unit A2104, a tracking processing unit A2105, a lost direction determination unit A2106, a standby field-of-view determination unit A2107, the image capturing area control unit A1108, and the communication unit A1109.

The PTZ drive apparatus A2102 performs PTZ driving based on an input PTZ control instruction and accordingly moves an image capturing area.

The subject detection unit A2104 analyzes an image (frame image) input from the image input apparatus A1101, based on input setting information. The subject detection unit A2104 then detects a subject in the frame image, and outputs detection information to the tracking processing unit A2105. Here, it is envisioned that a subject position (positional coordinates of the subject in the frame image) and a subject size (the size of the subject in the frame image) are output as the detection information. Note that other positional information or size information may be used as long as the information indicates the position and the size of the subject. Also, additional information such as a detected size and the detection accuracy may be included in a detection result.

The tracking processing unit A2105 performs tracking processing of the subject based on the input detection information and a target position input from the setting information input unit A1103. Specifically, as tracking processing, a subject position and a subject size are held as a tracking history. In addition, determination is performed as to whether or not the subject has been lost, based on the tracking history. Here, when detection of the subject fails consecutively in x frames of the input image, it is determined that loss of tracking occurred. Hereinafter, for ease of description, x=1.

Then, if it is determined that loss of tracking has not occurred, the tracking processing unit A2105 outputs the subject position, the subject size, and the target position to the image capturing area control unit A1108. On the other hand, if it is determined that loss of tracking has occurred, the tracking processing unit A2105 outputs the tracking history to the lost direction determination unit A2106.

The lost direction determination unit A2106 derives a lost direction of the subject based on the input tracking history. As described above, in the second embodiment, the lost direction is a direction of movement of the subject along the depth direction of the shot image immediately before loss of tracking occurred. In addition, also in the second embodiment, determination is performed as to whether or not the lost direction is precise (=derived with a predetermined degree of reliability or higher). Specifically, when the subject size at the target position changes to a larger size (the subject comes closer) or changes to a smaller size (the subject separates away) consecutively in y or more frames immediately before loss of tracking occurred, it is determined that the lost direction is precise. If it is determined that the derived lost direction is precise, the lost direction determination unit A2106 outputs the lost direction as a determination result, and, if it is determined that the derived lost direction is not precise, the lost direction determination unit A2106 outputs information indicating that the derived lost direction is not precise, as a determination result. The lost direction determination unit A2106 outputs the calculated lost direction and a detected size before loss of tracking (subject size immediately before loss of tracking occurred) to the standby field-of-view determination unit A2107.

The standby field-of-view determination unit A2107 calculates a standby field of view (zoom (Z) value) that corresponds to an image capturing area in which the subject is highly likely to be redetectable, based on the input determination on the lost direction and the detected size before loss of tracking. Specifically, when the lost direction is input as a determination result, the standby field-of-view determination unit A2107 determines that there is a zoom value with which the subject is highly likely to be present, and calculates a standby field of view. A zoom value with which a subject size immediately before loss of tracking occurred is a detectable size (larger than or equal to a minimum detection size and smaller than or equal to a maximum detection size) is set as a standby field of view, for example. At this time, the maximum detection size may be used if the lost direction is a "separating" direction, and the minimum detection size may be used if the lost direction is an "approaching" direction. A method for calculating a standby field of view will be described later in detail with reference to FIGS. 8 to 10.

On the other hand, when information indicating that the lost direction is not precise is input as a determination result, it is determined that there is no zoom value with which the subject is highly likely to be present, and the current zoom value is set as a standby field of view. The standby field-of-view determination unit A2107 outputs the standby field of view to the image capturing area control unit A1108.

Operation of Apparatus

Overall tracking processing is similar to that according to the first embodiment (FIG. 3), and thus a detailed description thereof is omitted. Processing for loss of tracking (step S004) according to the second embodiment will be described below in detail with reference to FIG. 8.

Figure 8:
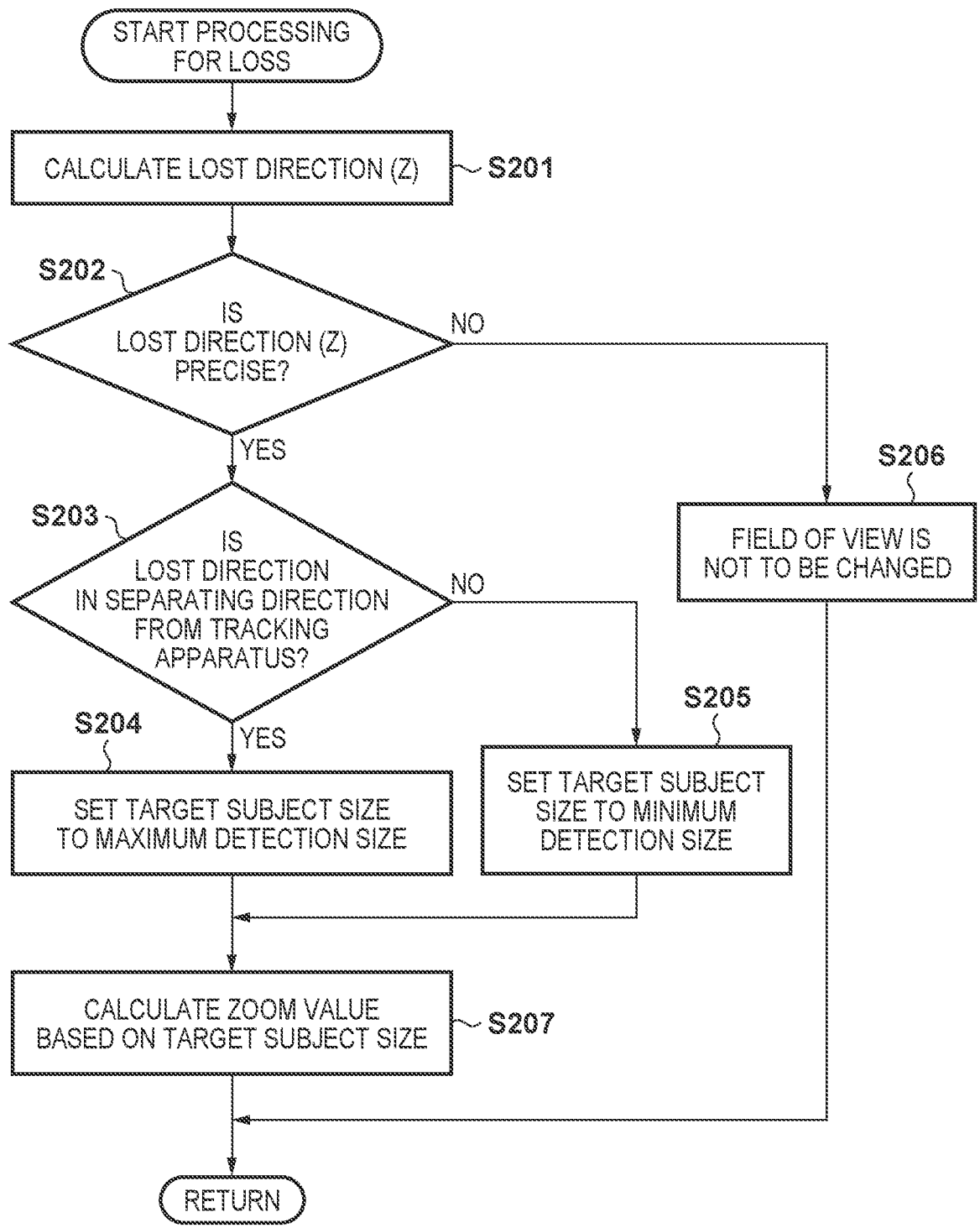
FIG. 8 is a detailed flowchart of processing for loss of tracking according to the second embodiment.

FIG. 8 is a detailed flowchart of processing for loss of tracking (step S004) according to the second embodiment. As described above, the tracking apparatus A2100 performs processing for loss of tracking based on a tracking history.

In step S201, the lost direction determination unit A2106 calculates a lost direction of a subject based on an input tracking history. Note that, unlike the first embodiment, here, a zoom value corresponding to the depth direction when viewed from the tracking apparatus is calculated as a lost direction.

In step S202, the lost direction determination unit A2106 determines whether or not the lost direction calculated in step S201 is precise (=derived with a predetermined degree of reliability or higher). If the lost direction is precise (Yes in step S202), the lost direction determination unit A2106 outputs the calculated lost direction and a detected size before loss of tracking and advances the procedure to step S203, and if the lost direction is not precise (No in step S202), advances the procedure to step S206. The determination method will be described in detail with reference to FIGS. 9 and 10.

FIG. 9 is a diagram describing the method for determining a lost direction. Frame images P201 to P203 represent three frames that exemplarily indicate in time series a situation where loss of tracking occurs when the subject is moving in a "separating" direction.

In the upper portion of FIG. 9, the frame image P201 of a yth frame (in the past) before occurrence of loss of tracking is shown. In the middle portion, the frame image P202 immediately before occurrence of loss of tracking (in other words, a frame in which the subject was lastly detected) is shown. In addition, in the lower portion, the frame image P203 immediately after occurrence of loss of tracking (in other words, a first frame in which the subject was lost) is shown. Reference sign P205 indicates the subject, and reference signs P206 and P207 indicate frames in which the subject is detected (rectangles circumscribed around the subject).

FIG. 10 is a diagram describing a detected size at a target field of view (shooting area). In FIG. 10, reference sign P212 indicates a target size of a detection frame in a frame image P211 at the target field of view (shooting area). In addition, reference sign P213 indicates the maximum size (the maximum detection size) of a detection frame, and P214 indicates the minimum size (minimum detection size) of a detection frame. A subject corresponding to a detection frame that is larger than the maximum detection size and a subject corresponding to a detection frame that is smaller than the minimum detection size may cause loss of tracking.

As described above, in the second embodiment, when the subject size at the target position changes to a larger size (the subject comes closer) or changes to a smaller size (the subject separates away) consecutively in y or more frames immediately before loss of tracking, it is determined that the lost direction is precise. Here, y=1, and when the subject size changes by a threshold value of m % or more, it is determined that the lost direction is precise. Specifically, in the situation shown in FIG. 9, when the size of P207 is (100−m) % or less of P206, it is determined that the lost direction is precise. Note that determination on the lost direction may be performed using another method, for example, by using the distance from the subject or a history of a zoom value.

In the situation shown in FIG. 9, despite a zoom-in (enlarge) instruction being given since the detection frame in the frame image P201 is small for the target field of view, the detection frame in the frame image P202 is yet smaller for the target field of view. For this reason, although another zoom-in instruction is given, the subject in the frame image P203 cannot be detected, and is lost. For this reason, it is determined that the lost direction is a "separating" direction. Here, the difference in size of the detection frame is larger than the threshold value of m %, and thus it is determined that the lost direction is precise.

In step S203, the lost direction determination unit A2106 determines whether or not the lost direction calculated in step S202 is a "separating" direction. If the lost direction is a "separating" direction, the procedure advances to step S204, otherwise the procedure advances to step S205. In step S204, the standby field-of-view determination unit A2107 sets the target size to the maximum detection size. On the other hand, in step S205, the standby field-of-view determination unit A2107 sets the target size to the minimum detection size.

In step S206, the standby field-of-view determination unit A2107 sets information regarding the current zoom value as a standby field of view, ends processing for loss of tracking, and advances the procedure to step S006. That is to say, the standby field-of-view determination unit A2107 determines that it is not possible to determine a specific zoom value with which the subject is highly likely to be detected, and determines that the field of view is not changed through zoom control.

In step S207, the standby field-of-view determination unit A2107 calculates a zoom value as a standby field of view, based on a zoom value and a target size immediately before loss of tracking, ends the processing for loss of tracking, and advances the procedure to step S006. The standby field-of-view determination unit A2107 calculates a zoom value such that the detected size immediately before loss of tracking matches the maximum detection size, for example.

As described above, according to the second embodiment, when the subject is lost during tracking control, similarly to the first embodiment, an operation that is to be performed is changed depending on whether or not the lost direction of the subject is precise. Specifically, if the lost direction is precise, zoom control is performed so as to set a zoom value at which the subject is highly likely to be detected, based on a tracking history before loss of tracking occurred. Performing such control makes it easier to redetect the subject after loss of tracking occurred and perform tracking control again.

Third Embodiment

In a third embodiment, control that can address a case where a subject moves in both a direction along the plane of a shot image and the depth direction will be described. That is to say, in the third embodiment, an aspect will be described in which control of a shooting area when a subject is lost is performed using the combination of pan, tilt, and zoom (PTZ).

System Configuration and Apparatus Configuration

In the system configuration, the tracking apparatus A1100 and the PT drive apparatus A1102 in FIG. 1 are replaced with a tracking apparatus A3100 and the PTZ drive apparatus A2102, respectively, and thus a detailed description thereof is omitted.

Figure 11:
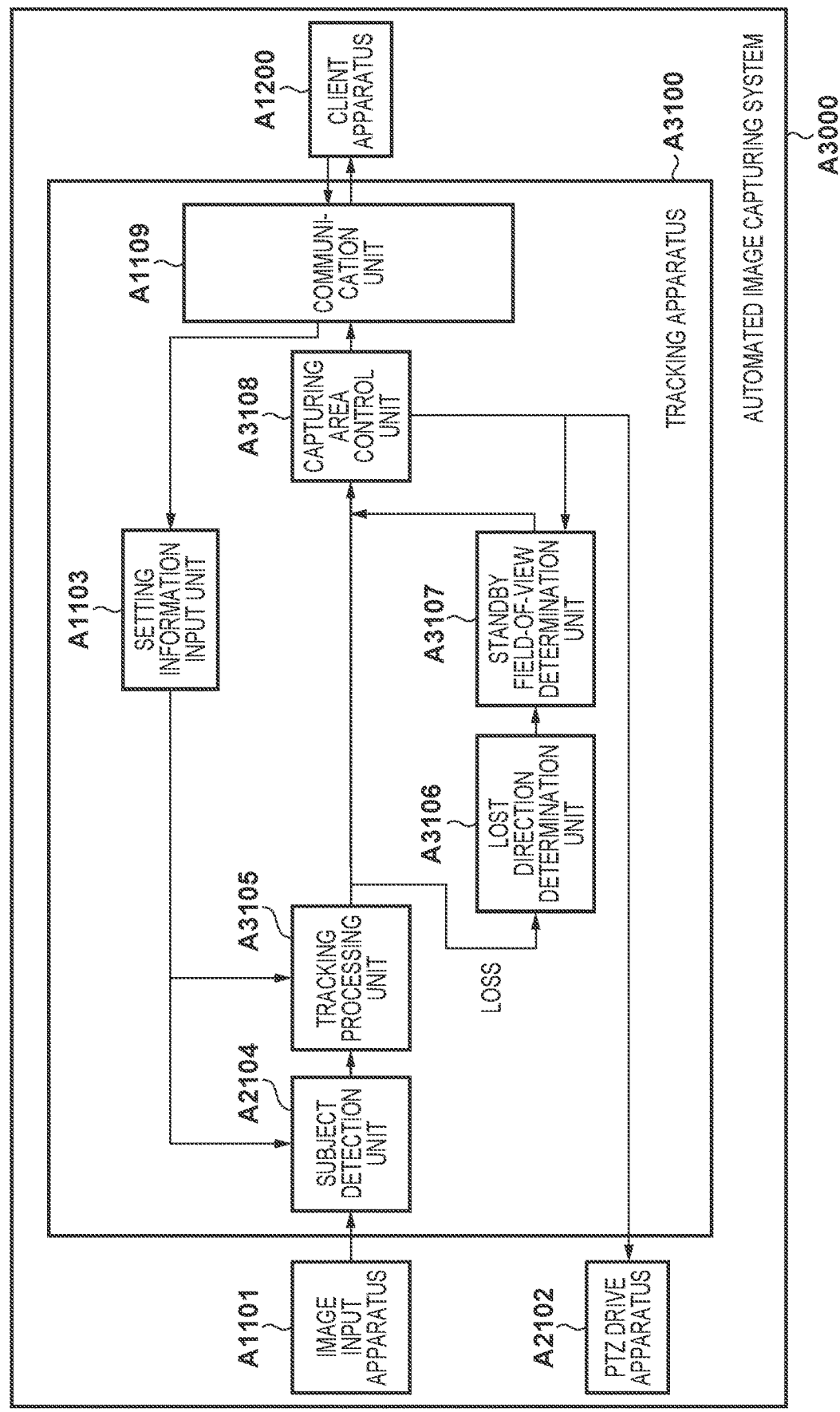
FIG. 11 is a block diagram showing a functional configuration of a tracking apparatus according to a third embodiment.

FIG. 11 is a block diagram showing a functional configuration of the tracking apparatus A3100 according to the third embodiment. Note that function units that are given the same reference signs as those in the second embodiment (FIG. 7) have similar functions, and thus a description thereof is omitted.

The tracking apparatus A3100 includes the setting information input unit A1103, the subject detection unit A2104, a tracking processing unit A3105, a lost direction determination unit A3106, a standby field-of-view determination unit A3107, an image capturing area control unit A3108, and the communication unit A1109.

The tracking processing unit A3105 performs processing for tracking a subject, based on input detection information and a target position input from the setting information input unit A1103. Specifically, as tracking processing, a subject position and a subject size are held as a tracking history. In addition, determination is performed as to whether or not the subject has been lost, based on the tracking history. Here, when detection of the subject fails consecutively in x frames of the input image, it is determined that loss of tracking has occurred. Hereinafter, for ease of description, x=1.

Then, if it is determined that loss of tracking has not occurred, the tracking processing unit A3105 outputs a subject position, a subject size, and a target position to the image capturing area control unit A3108. On the other hand, if it is determined that loss of tracking has occurred, the tracking history is output to the lost direction determination unit A3106.

The lost direction determination unit A3106 derives a lost direction of the subject based on the input tracking history. In the third embodiment, determination is performed for each of a PT direction and a zoom direction. In addition, also in the third embodiment, determination is performed as to whether or not the lost direction is precise, for each of the PT direction and the zoom direction.

Specifically, in terms of the PT direction, when the subject position is separated away from the target position consecutively in y or more frames in the same direction immediately before loss of tracking, and the positional difference therebetween is larger than or equal to a threshold value, the lost direction determination unit A3106 determines that the lost direction (PT direction) is precise. In addition, in terms of the zoom direction, when the subject size at the target position changes to a larger size (the subject comes closer) or changes to a smaller size (the subject separates away) consecutively in y or more frames immediately before loss of tracking, the lost direction determination unit A3106 determines that the lost direction (zoom direction) is precise.

If it is determined that the derived lost direction is precise for each of the PT direction and the zoom direction, the lost direction determination unit A3106 outputs the lost direction as a determination result. If it is determined that the derived lost direction is not precise, the lost direction determination unit A3106 outputs information indicating that the derived lost direction is not precise, as a determination result. The lost direction determination unit A3106 outputs the lost direction calculated for each of the PT direction and the zoom direction and detection information before loss of tracking, to the standby field-of-view determination unit A3107. The detection information before loss of tracking includes a subject position and a subject size immediately before occurrence of loss of tracking.

The standby field-of-view determination unit A3107 obtains PTZ control instruction information before loss of tracking (one or more instructions of PTZ control performed before loss of tracking) held by the image capturing area control unit A3108. The standby field-of-view determination unit A3107 calculates standby field of views (PT value and zoom value) corresponding to an image capturing area in which the subject is highly likely to be redetected, based on the obtained PTZ control instruction information before loss of tracking, input determination on the lost direction, and the detection information before loss of tracking. Specifically, when a lost direction is input as a determination result, it is determined that there is a PT value and zoom value at which the subject is highly likely to be present, and calculates standby field of views. A method for calculating standby field of views will be described in detail later with reference to FIG. 12.

On the other hand, when information indicating that the lost direction is not precise is input as a determination result, it is determined that there is no PT value and zoom value at which the subject is highly likely to be present, and the current PT value and zoom value are set as standby field of views. The standby field-of-view determination unit A3107 outputs the standby field of views to the image capturing area control unit A3108.

When loss of tracking has not occurred, the image capturing area control unit A3108 continues tracking control based on the subject position and the target position input from the tracking processing unit A3105. Furthermore, PTZ control instruction information for the most recent n frames is held as history information. Here, for ease of description, n=1, and only PTZ control instruction immediately before loss of tracking is held. On the other hand, when loss of tracking occurs, a history of PTZ control instruction is output to the standby field-of-view determination unit A3107, as processing for loss of tracking. Furthermore, PTZ control is performed based on the standby field of view input from the standby field-of-view determination unit A3107. Specifically, the image capturing area control unit A3108 outputs a PTZ control instruction to the PTZ drive apparatus A2102, and outputs an image to the communication unit A1109.

Operation of Apparatus

Overall tracking processing is substantially the same as that according to the first embodiment (FIG. 3), but, in step S007, the image capturing area control unit A3108 holds PTZ control instruction as history information. Processing for loss of tracking (step S004) according to the third embodiment will be described in detail below with reference to FIG. 12.

Figure 12:
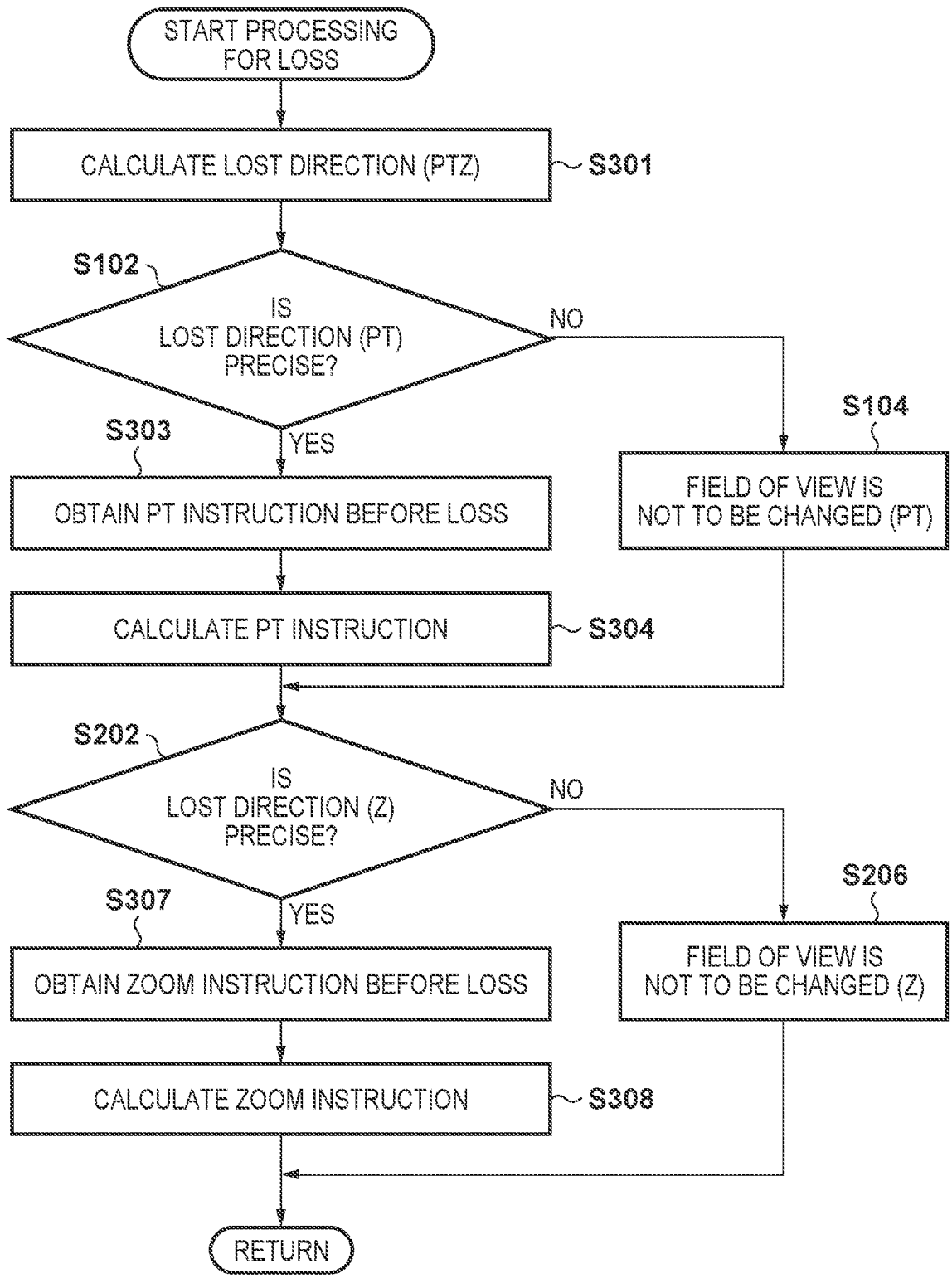
FIG. 12 is a detailed flowchart of processing for loss of tracking according to the third embodiment.

FIG. 12 is a detailed flowchart of processing for loss of tracking (step S004) according to the third embodiment. As described above, the tracking apparatus A3100 performs processing for loss of tracking based on a tracking history.

In step S301, the lost direction determination unit A3106 calculates a lost direction of a subject based on an input tracking history. As described above, a PT direction and a zoom direction are each calculated as a lost direction.

In step S303, the standby field-of-view determination unit A3107 obtains a PT direction control amount included in the PTZ control instruction information before loss of tracking held in the image capturing area control unit A3108. In step S304, the standby field-of-view determination unit A3107 calculates a field of view (PT direction) at which the subject is highly likely to be redetectable, using the obtained PT direction control amount and a predetermined coefficient $\alpha$. Specifically, a PT control instruction of a control amount obtained by multiplying the PT direction control amount by the predetermined coefficient $\alpha$ is calculated.

Here, a fixed value $\alpha$ is envisioned as the predetermined coefficient, but the coefficient may be changed in accordance with the amount of movement of the subject in the PT direction immediately before loss of tracking, for example, by defining a table. In addition, the average of or the largest value among PT direction control amounts of n frames before loss of tracking may also be used as a PT direction control amount before loss of tracking.

In step S307, the standby field-of-view determination unit A3107 obtains a zoom direction control amount included in the PTZ control instruction information before loss of tracking held in the image capturing area control unit A3108. In step S308, the standby field-of-view determination unit A3107 calculates a field of view (zoom direction) at which the subject is highly likely to be redetectable, using the obtained zoom direction control amount and a predetermined coefficient $\beta$. Specifically, a zoom control instruction of a control amount obtained by multiplying the zoom direction control amount by the predetermined coefficient $\beta$ is calculated.

Here, a fixed value $\beta$ is envisioned as the predetermined coefficient, but the coefficient may be changed in accordance with the amount of movement of the subject in the zoom direction immediately before loss of tracking (or a change amount of the subject size), for example, by defining a table. In addition, the average of or the largest value among zoom direction control amounts of n frames before loss of tracking may also be used as a zoom direction control amount before loss of tracking.

As described above, according to the third embodiment, if a subject is lost during tracking control, similarly to the first and second embodiments, an operation that is performed is changed depending on whether or not a lost direction of the subject is precise. Particularly, a control instruction for setting a field of view at which the subject is highly likely to be redetectable is calculated, for each of the PT direction and the zoom direction. Performing such control makes it easier to redetect the subject after occurrence of loss of tracking and perform tracking control again.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-072672, filed Apr. 26, 2022, which is hereby incorporated by reference herein in its entirety.

What is claimed is:

1. A control apparatus that controls tracking shooting performed by an image capturing apparatus, the control apparatus comprising:
    a detection unit configured to detect a subject in an image obtained by the image capturing apparatus;
    a tracking unit configured to track the subject by controlling a capturing direction of the image capturing apparatus based on a position of the subject detected by the detection unit; and
    a processing unit configured to perform predetermined processing when a lost state where the detection unit is unable to detect a subject occurs while the tracking unit is tracking the subject,
    the processing unit includes:
        a decision unit configured to decide whether or not it is possible to derive, with a first degree of reliability or higher, a direction of movement of a subject immediately before occurrence of the lost state, and
        a determination unit configured to, if the decision unit decides that it is possible to derive the direction of movement with the first degree of reliability or higher, perform processing for determining the capturing direction of the image capturing apparatus after occurrence of the lost state based on the direction of movement, as the predetermined processing.

2. The control apparatus according to claim 1, wherein the decision unit derives, based on a history of control of a capturing direction performed by the tracking unit, a direction of movement of a subject immediately before occurrence of the lost state and a degree of reliability of the direction of movement.

3. The control apparatus according to claim 1, wherein, if the decision unit decides that it is not possible to derive the direction of movement with the first degree of reliability or higher, the determination unit determines a current capturing direction or a predetermined initial direction of the image capturing apparatus as being the capturing direction.

4. The control apparatus according to claim 1, wherein the control apparatus is configured to perform pan-tilt (PT) control on tracking shooting performed by the image capturing apparatus, and
    if the decision unit decides that it is possible to derive the direction of movement with the first degree of reliability or more, the determination unit determines the direction of movement as the capturing direction by performing PT control so as to change the current capturing direction of the image capturing apparatus to the direction of movement in a range in which a position of a subject immediately before occurrence of the lost state is fully in view.

5. The control apparatus according to claim 1, wherein, when a lost state where the detection unit is unable to detect a subject continues for a predetermined time period after control is performed so as to change the current capturing direction of the image capturing apparatus to the determined capturing direction, the tracking unit performs control so as to change the capturing direction of the image capturing apparatus to a predetermined initial direction.

6. The control apparatus according to claim 1, wherein, if the capturing direction determined based on the direction of movement is out of a control range of a capturing direction of the image capturing apparatus, the determination unit determines the current capturing direction or the predetermined initial direction of the image capturing apparatus as the capturing direction.

7. The control apparatus according to claim 1, wherein the control apparatus is configured to perform pan-tilt-zoom (PTZ) control on tracking shooting performed by the image capturing apparatus,
    the tracking unit further controls a shooting field of view of the image capturing apparatus based on a size of the subject detected by the detection unit,
    the decision unit further decides whether or not it is possible to derive, with a second degree of reliability or higher, a second direction of movement in a depth direction of the image of the subject immediately before occurrence of the lost state, and
    if the decision unit decides that it is possible to derive the second direction of movement with the second degree of reliability or higher, the determination unit further determines a shooting field of view that is a shooting field of view after occurrence of the lost state of the image capturing apparatus, based on the second direction of movement.

8. The control apparatus according to claim 7, wherein the determination unit calculates a control amount obtained by multiplying a first coefficient by a PT direction control amount of control performed by the tracking unit immediately before occurrence of the lost state, as a control amount for performing control for changing the current capturing direction to the determined capturing direction, and calculates a control amount obtained by multiplying a second coefficient by a zoom direction control amount of control performed by the tracking unit immediately before occurrence of the lost state, as a control amount for performing control so as to change a current shooting field of view to the determined shooting field of view.

9. A control apparatus that controls tracking shooting performed by an image capturing apparatus, the control apparatus comprising:
    a detection unit configured to detect a subject in an image obtained by the image capturing apparatus;
    a tracking unit configured to track the subject by controlling a shooting field of view of the image capturing apparatus based on a size of the subject detected by the detection unit;
    a processing unit configured to perform predetermined processing when a lost state where the detection unit is unable to detect a subject occurs while the tracking unit is tracking the subject,
    the processing unit includes:
        a decision unit configured to decide whether or not it is possible to derive, with a predetermined degree of reliability or higher, a direction of movement of the subject in the depth direction of the image immediately before occurrence of the lost state, and
        a determination unit configured to, if the decision unit decides that it is possible to derive the direction of movement with the predetermined degree of reliability or higher, perform processing for determining a shooting field of view that is a shooting field of view after occurrence of the lost state of the image capturing apparatus based on the direction of movement, as the predetermined processing.

10. A control method of a control apparatus that controls tracking shooting performed by an image capturing apparatus, the method comprising:

detecting a subject in an image obtained by the image capturing apparatus, and tracking the subject by controlling a capturing direction of the image capturing apparatus based on a detected position of the subject; and performing predetermined processing when a lost state where the subject is not detected occurs while the subject is being tracked in the tracking, and the processing include:
  deciding whether or not it is possible to derive, with a predetermined degree of reliability or higher, a direction of movement of a subject immediately before occurrence of the lost state, and
  performing, if it is decided in the deciding that it is possible to derive the direction of movement with the predetermined degree of reliability or higher, processing for determining the capturing direction of the image capturing apparatus after occurrence of the lost state based on the direction of movement, as the predetermined processing.

11. A control method of a control apparatus that controls tracking shooting performed by an image capturing apparatus, the method comprising:

detecting a subject in an image obtained by the image capturing apparatus, and tracking the subject by controlling a shooting field of view of the image capturing apparatus based on a detected size of the subject; and
  performing predetermined processing when a lost state where the subject is not detected occurs while subject is being tracked in the tracking, and
  the processing include:
    deciding whether or not it is possible to derive, with a predetermined degree of reliability or higher, a direction of movement of the subject in a depth direction of the image immediately before occurrence of the lost state, and
    performing, if it is decided in the deciding that it is possible to derive the direction of movement with the predetermined degree of reliability or higher, processing for determining a shooting field of view that is a shooting field of view after occurrence of the lost state of the image capturing apparatus based on the direction of movement, as the predetermined processing.

12. A non-transitory computer-readable recording medium storing a program for causing a computer to execute a control method of a control apparatus that controls tracking shooting performed by an image capturing apparatus, the method comprising:

detecting a subject in an image obtained by the image capturing apparatus, and tracking the subject by controlling a capturing direction of the image capturing apparatus based on a detected position of the subject; and performing predetermined processing when a lost state where the subject is not detected occurs while the subject is being tracked in the tracking, and the processing include:
    deciding whether or not it is possible to derive, with a predetermined degree of reliability or higher, a direction of movement of a subject immediately before occurrence of the lost state, and
    performing, if it is decided in the deciding that it is possible to derive the direction of movement with the predetermined degree of reliability or higher, processing for determining the capturing direction of the image capturing apparatus after occurrence of the lost state based on the direction of movement, as the predetermined processing.

13. A non-transitory computer-readable recording medium storing a program for causing a computer to execute a control method of a control apparatus that controls tracking shooting performed by an image capturing apparatus, the method comprising:

detecting a subject in an image obtained by the image capturing apparatus, and tracking the subject by controlling a shooting field of view of the image capturing apparatus based on a detected size of the subject; and
  performing predetermined processing when a lost state where the subject is not detected occurs while subject is being tracked in the tracking, and
  the processing include:
    deciding whether or not it is possible to derive, with a predetermined degree of reliability or higher, a direction of movement of the subject in a depth direction of the image immediately before occurrence of the lost state, and
    performing, if it is decided in the deciding that it is possible to derive the direction of movement with the predetermined degree of reliability or higher, processing for determining a shooting field of view that is a shooting field of view after occurrence of the lost state of the image capturing apparatus based on the direction of movement, as the predetermined processing.

* * * * *